United States Patent [19]

Black

[11] Patent Number: 4,763,765

[45] Date of Patent: Aug. 16, 1988

[54] CONE CLUTCH TRANSMISSION

[75] Inventor: James B. Black, Roscoe, Ill.

[73] Assignee: Twin Disc, Incorporated, Racine, Wis.

[21] Appl. No.: 40,021

[22] Filed: Apr. 20, 1987

[51] Int. Cl.[4] .................. F16D 13/28; F16D 25/10
[52] U.S. Cl. .................. 192/48.91; 192/70.15; 192/70.28; 192/87.15; 192/87.17
[58] Field of Search ............ 192/70.15, 48.91, 70.28, 192/86, 87.16, 87.17, 87.15, 87.14

[56] References Cited

U.S. PATENT DOCUMENTS

| Re. 29,601 | 4/1978 | Richards | 74/339 |
|---|---|---|---|
| 1,009,836 | 11/1911 | Fowler | 192/70.15 |
| 1,011,040 | 12/1911 | Dennison | 192/70.15 |
| 1,588,272 | 6/1926 | Scanlan | 192/70.15 X |
| 3,243,026 | 3/1966 | Snoy et al. | 192/87.17 |
| 3,324,981 | 6/1967 | Aschauer | 192/87.17 X |
| 3,362,511 | 1/1968 | Aschauer | 192/70.15 X |
| 3,390,590 | 7/1968 | Natschke et al. | 192/70.15 X |
| 3,585,873 | 6/1971 | Austen | 74/339 |
| 4,545,469 | 10/1985 | Yogome et al. | 192/51 |

FOREIGN PATENT DOCUMENTS

| 296826 | 3/1917 | Fed. Rep. of Germany | 192/70.15 |
|---|---|---|---|
| 454130 | 6/1913 | France | 192/70.15 |
| 17533 | of 1909 | United Kingdom | 192/70.15 |

OTHER PUBLICATIONS

The "Twyncone" Friction Clutch & Coupling, Folder No. 427, Link-Belt Company, 1/27.

Primary Examiner—Rodney H. Bonck
Attorney, Agent, or Firm—James E. Nilles

[57] ABSTRACT

A drive member such as a gear of a pulley cooperates with a pair of clutch elements, each of which has a splined connection with a shaft. One clutch element is axially fixed; the other is shiftable through a small distance towards and from the fixed one. Each clutch element has a conical surface concentric to the shaft that tapers oppositely to the conical surface on the other. The drive member has an inner periphery of larger diameter than the shaft and has oppositely tapering conical surfaces that respectively mate with the conical surfaces on the clutch elements, which thus at all times maintain the drive member coaxial with the shaft and confine it against axial shifting. An actuator urges the shiftable clutch element towards the fixed one to engage the clutch elements with the drive member. A spring biases the clutch elements apart so that the mating conical surfaces can serve as bearings lubricated by oil delivered through the shaft.

4 Claims, 1 Drawing Sheet

CONE CLUTCH TRANSMISSION

FIELD OF THE INVENTION

This invention relates to apparatus that comprises a rotatable shaft, a rotatable drive member such as a gear, and clutch means for establishing the drive member in either of two alternative conditions, in one of which it is permitted to rotate relative to the shaft and in the other of which it is constrained to rotate with the shaft; and the invention is more particularly concerned with apparatus of this type that is simple, compact and inexpensive by reason of its being so arranged that the clutch means at all times supports the drive member in concentric relation to the shaft and confines the drive member against substantial axial shifting relative to the shaft.

BACKGROUND OF THE PRIOR ART

There are many known transmission mechanisms that comprise a cone clutch whereby a drive member such as a gear can either be coupled with a rotatable shaft for rotation with it or uncoupled from the shaft for rotation relative to it. In most mechanisms of this type, the cone clutch comprises at least one clutch element that has a splined connection with the shaft and has a conical surface concentric with the shaft. The drive member is rotatably mounted either on the shaft itself or on some other journal that is concentric with the shaft, and in either case it has a concentric conical surface which mates with the conical surface on the clutch element. For constraining the drive member to rotate with the shaft, the clutch element is shifted axially along the shaft to a position in which the conical surfaces are engaged under bias. Shifting the clutch element axially through a small distance away from this position disengages the conical surfaces and frees the drive member for rotation relative to the shaft. In some such mechanisms there are two clutch elements, located at axially opposite sides of the drive member or of an intermediate member that is confined to coaxial rotation with the drive member, and each clutch element has a conical surface that cooperates with one of a pair of mating conical surfaces on the drive member or on the intermediate member.

In all of these mechanisms the drive member and the clutch element or clutch elements have been mounted axially adjacent to one another, and usually, too, the mechanism further included an actuator on the shaft for effecting clutch element shifting to provide for coupling and uncoupling the drive member. Thus, the mechanism was relatively bulky, in that it extended through a substantial distance along the shaft. In addition, it was necessary to provide bearings on which the drive member was mounted for its rotation relative to the shaft and by which it was confined against axial displacement, and these were relatively expensive.

SUMMARY OF THE INVENTION

The general object of this invention is to provide unusually compact, simple and inexpensive apparatus comprising a rotatable shaft, a drive member such as a gear or a pulley, and clutch means whereby the drive member is either constrained to rotate with the shaft or permitted to rotate relative to it, said apparatus being so arranged that the clutch means at all times supports the drive member in concentric relation to the shaft and substantially confines it against axial shifting relative to the shaft, so that no special bearing is needed for the drive member.

Another general object of this invention is to provide a mechanism comprising a rotatable shaft, a drive member such as a gear, and a pair of clutch elements which rotate with the shaft and which support the drive member in concentric relation to the shaft both in an engaged condition wherein the clutch elements constrain the drive member to rotate with the shaft and in a disengaged condition wherein the drive member is rotatable relative to the shaft, said clutch elements and drive member being arranged in an axially compact relationship that permits the shaft to be relatively short.

These and other objects of the invention that will appear as the description proceeds are achieved in the apparatus of this invention which comprises, in general, a rotatable shaft, a rotatable drive member, and clutch means that can be selectably and alternatively established in an engaged condition wherein the clutch means constrains the drive member to rotate with the shaft and in a disengaged condition wherein the drive member can rotate relative to the shaft. The apparatus of this invention is characterized by said clutch means comprising a pair of axially spaced clutch elements on said shaft that are constrained to rotate therewith, each said clutch element having a conical surface which is concentric with the shaft and which tapers in one axial direction, the direction of taper of each said surface being opposite to that of the other, one of said clutch elements being confined against axial shifting relative to the shaft and the other of said clutch elements being shiftable through a limited distance along the shaft towards and from said one clutch element. The apparatus is further characterized in that the drive member is annular, with an inner periphery which is larger in diameter than the shaft, and it has a pair of concentric conical surfaces, one for each clutch element and each of which mates with the conical surface on its clutch element so that the clutch elements at all times support the drive member in concentric radially spaced relation to the shaft and confine the drive member against substantial axial shifting relative to the shaft. The apparatus further comprises first actuating means for producing a reaction between the clutch elements that urges them apart and thus shifts said other clutch element axially away from said one clutch element for establishing one of said conditions, and second actuating means reacting between said shaft and said other clutch element for shifting the latter axially towards said one clutch element, to establish the other of said conditions.

BRIEF DESCRIPTION OF DRAWINGS

In the accompanying drawings, which illustrate what are now regarded as preferred embodiments of the invention.

DETAILED DESCRIPTION OF PREFERRED EMBODIMENT OF THE INVENTION

Figure 1:
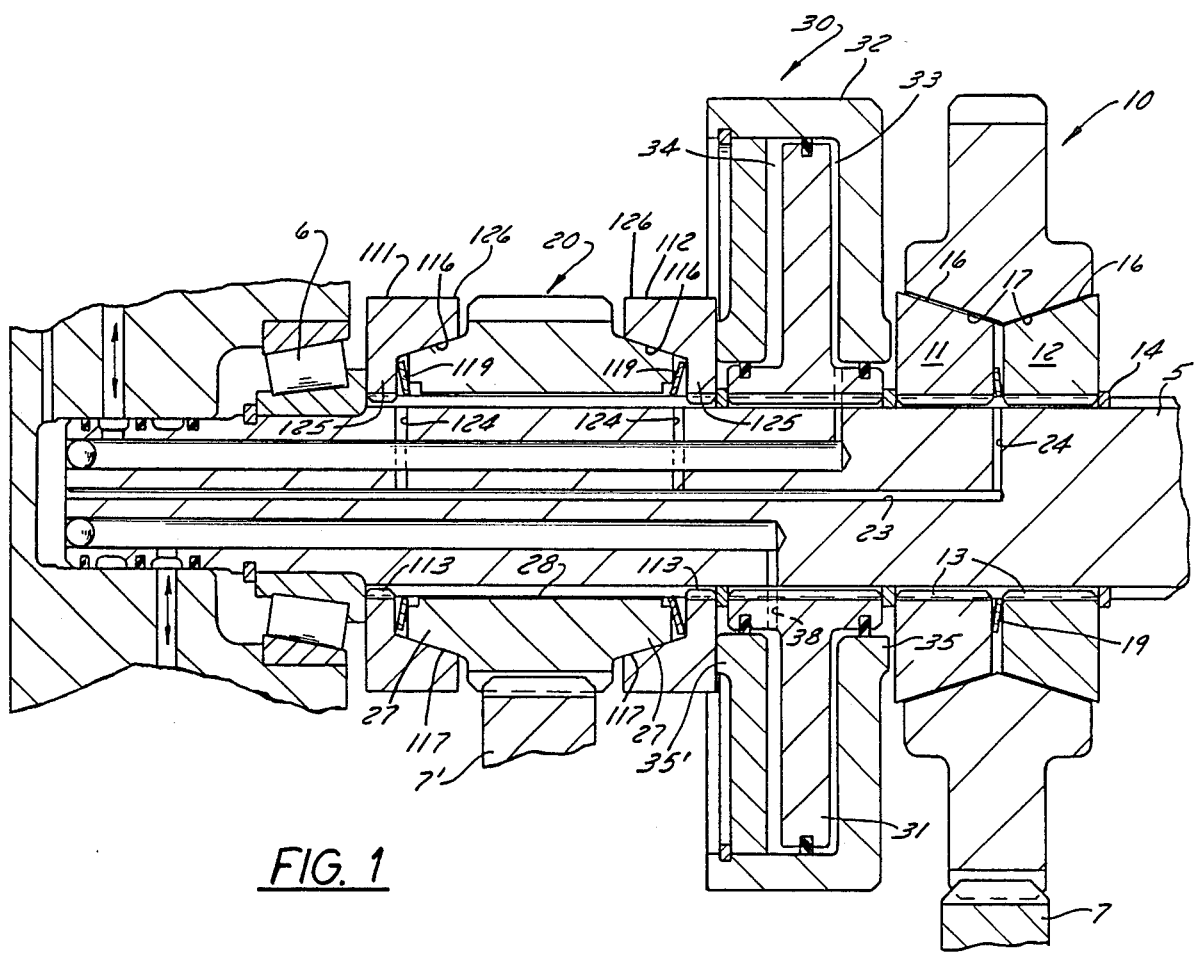
FIG. 1 is a view in longitudinal section of mechanism comprising two gears and embodying the principles of this invention, shown in the condition in which the clutch means for the left-hand gear is engaged.
Figure 2:
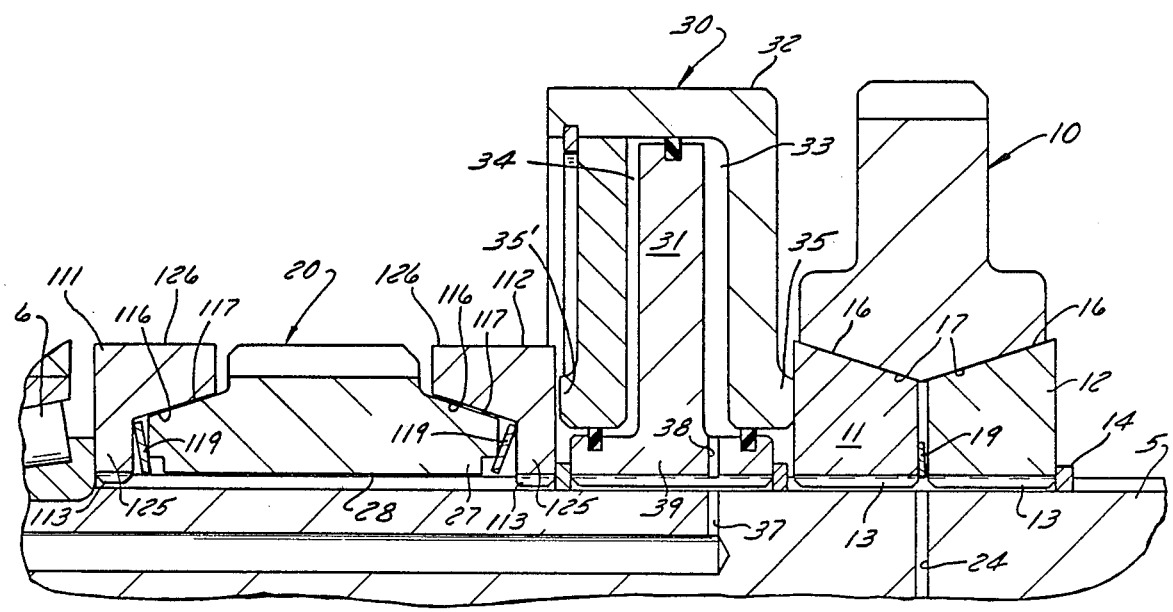
FIG. 2 is a view generally similar to FIG. 1 but showing the condition in which the right-hand gear is engaged.

In the accompanying drawing the shaft 5 is assumed to be confined to rotation in any suitable manner, and it will be understood that it is supported for such rotation in suitable axially spaced bearings 6, only one of which is shown. In this case the shaft 5 supports two drive members 10 and 20, the drive member 10 being of substantially larger diameter than the drive member 20. The drive members 10, 20 are here illustrated as gears, but it will be apparent from the following description that the principles of the invention could as well be embodied in apparatus having rotary drive members in the form of pulleys, cams or the like. It will also be apparent that each of the drive members 10, 20 is in mesh with a gear 7, 7', respectively, from which it may be rotatably driven or which it may drive.

A characterizing feature of the present invention is that each of the drive members 10, 20 has an inside diameter which is larger than the diameter of the shaft 5, so that each drive member is radially spaced from the shaft although, as explained hereinafter, the drive member is supported from the shaft, maintained in concentric relation to it, and substantially confined against axial shifting relative to it.

Considering first the larger diameter right-hand drive member 10, which represents one preferred embodiment of the invention, it cooperates with a pair of clutch elements 11 and 12, each of which has a splined connection 13 with the shaft 5. The two clutch elements 11, 12 are preferably identical, and the drive member 10, which is annular, can be symmetrical to a plane normal to its axis. The right-hand clutch element 12 is confined against shifting to the right by means of an abutment or stop 14 on the shaft, here shown as a clip ring that is received in a circumferential groove in the shaft. The left-hand clutch element 11 is disposed between the right-hand clutch element 12 and an actuator 30, described hereinafter, that is fixed on the shaft. The left-hand clutch element 11 is shiftable through a small distance along the shaft under the control of the actuator 30.

Each of the clutch elements 11, 12 is annular, having an inner periphery formed to provide its splined connection 13 with the shaft and an outer periphery that provides a radially outer conical surface 16 which is concentric to the shaft and which tapers in one direction. In this case the conical surface 16 on each clutch element 11, 12 tapers in the axial direction towards the other clutch element 12, 11.

The annular drive member 10 has its inner periphery formed to provide two concentric radially inner conical surfaces 17, one for each clutch element and each of which mates with the conical surface 16 on its clutch element. Thus, each of the conical surfaces 17 on the drive member converges axially inwardly towards the other. The two conical surfaces 17 on the drive member may have a junction at their small diameter ends, as here shown, or there may be a ridge or groove between them, but in any case the smallest inside diameter of the drive member will be substantially larger than the diameter of the shaft 5, so that the drive member is in radially spaced relation to the shaft.

When the actuator 30, acting as described below, forces the left-hand clutch element 11 towards the right-hand clutch element 12, the radially outer conical surfaces 16 on the clutch elements are engaged under axial bias against their mating conical surfaces 17 on the drive member 10, and the drive member is thus constrained by the clutch elements to rotate with the shaft 5. In this engaged condition of the clutch elements they support the drive member in concentric relation to the shaft 5 and confine the drive member against axial shifting relative to the shaft.

Confined between the clutch elements 11, 12 and reacting against both of them to urge them apart is a compression spring 19 which is here shown as a Belleville washer but which could be a wave washer or a coiled spring. Thus, when the actuator 30 permits the spring 19 to do so, the spring shifts the left-hand clutch element 11 axially away from the right-hand clutch element 12, so that the drive member is then free for rotation relative to the clutch elements, the conical surfaces 16, 17 then serving as bearings. For lubrication of the conical surfaces in this condition, oil is delivered to them by way of a longitudinal passage 23 in the shaft 5 that has a lateral outlet 24 to the space between the clutch elements 11, 12. It will be apparent that in the disengaged condition of the clutch elements, the conical surfaces 16, 17 continue to maintain the drive member 10 in coaxial relation to the shaft and substantially confine it against axial shifting relative to the shaft.

It will be appreciated that in place of the spring means 19 here shown, the axially movable clutch element 11 could be shifted away from the fixed clutch element 12 by other suitable means, as for example by pressurized oil delivered through the connected bores 23, 24 in the shaft 5 to the space between the clutch elements, for reaction between them.

Turning now to the smaller diameter drive member 20, it cooperates with a pair of clutch elements 111, 112 which can be identical with one another and which are disposed at axially opposite sides of it. Each of the clutch elements 111, 112 has a splined connection 113 with the shaft 5, but the left-hand clutch element 111 is confined against movement to the left by the axially adjacent shaft bearing 6, which serves as an abutment for it. The right-hand clutch element 112 is shiftable through a small distance in each direction along the shaft under the control of the actuator 30, which is mounted on the shaft between the clutch element 112 and the clutch element 11.

Each of the clutch elements 111 and 112 has an axially outer portion 125 that provides its splined connection 113 to the shaft and has an axially inner portion 126 which projects towards the drive member 20 and on which there is a radially inner conical surface 116 that is concentric to the shaft 5. The conical surface 116 has its small diameter end adjacent to the axially outer portion 125 of the clutch element so that it diverges in the direction towards the drive member 20. The drive member, which can be symmetrical to a plane normal to its axis, has concentric axially oppositely projecting hub-like portions 27, on each of which there is a concentric radially outer conical surface 117 that tapers axially outwardly and mates with the conical surface 116 on the adjacent clutch element 111 or 112. In this case the inner periphery 28 of the annular drive member 20 is cylindrical and has a diameter larger than the diameter of the shaft 5. Between the drive member 20 and each of the clutch elements 111, 112 is a compression spring 119 which can be a Belleville washer. These springs 119 cooperate with one another and the drive member to react between the clutch members and urge the axially shiftable clutch member 111 away from the other clutch member 112.

It will be apparent that when the actuator 30 forces the axially shiftable clutch element 112 to the left, effecting relative convergence of the clutch elements 111, 112, the conical clutch element surfaces 116 engage the mating conical drive member surfaces 117 under axial bias so that the drive member is constrained to rotate with the clutch elements; whereas when the actuator permits the clutch element 111 to shift to the right under the bias of the springs 119, the drive member 20 is free for rotation relative to the clutch elements, with the conical surfaces 116, 117 serving as bearings for such rotation. The conical surfaces are lubricated by oil delivered through the shaft passage 23 by way of lateral outlets 124 to the space between each clutch element 111, 112 and the drive member 20. In this case, too, the clutch elements 111, 112 at all times serve to maintain the drive member in concentric relation to the shaft and to confine it against substantial axial displacement relative to the shaft.

The actuator 30 can be of a type generally conventional in hydraulically controlled gear change transmissions. As here shown it is double acting, and it so cooperates with the two axially shiftable clutch elements 11 and 112 as to establish a selected one of the drive members 10, 20 in its engaged condition, in which that drive member is constrained to rotate with the shaft 5, while leaving the other drive member 20, 10 free for rotation relative to the shaft. The actuator 30 comprises a stationary disc-like piston 31 that is concentrically fixed to the shaft 5 and an axially movable cylinder 32 in which that piston 31 is enclosed and which cooperates with the piston to define a pair of pressure chambers 33, 34 that are at axially opposite sides of the piston. The cylinder 32 has concentric hub-like portions that project axially outwardly from it, one of those hub-like portions 35 being engaged against the clutch element 11 that is associated with the drive member 10, the other 35 being engaged with the clutch element 112 for the drive member 20. Obviously pressurization of the right hand chamber 33 shifts the cylinder to the right, bringing the drive member 10 to its engaged condition, while pressurization of the left chamber 34 shifts the clutch element 112 to the left, bringing the drive member 20 to its engaged condition.

Through suitable passages 37 that extend through the shaft and registering passages 38 in a hub portion 39 of the stationary piston, pressure fluid can be brought into either chamber 33, 34 while fluid is exhausted from the other chamber 34, 33. Flow of pressure and exhaust fluid through the passages 37 is controlled by suitable valve means (not shown).

From the foregoing description taken with the accompanying drawings, it will be apparent that this invention provides a very compact and inexpensive transmission of the type comprising a rotatable shaft and clutch means whereby a rotatable drive member concentric with the shaft can be constrained to rotate with it or disengaged for rotation relative to it.

What is claimed as the invention is:

1. Torque transmitting apparatus comprising a shaft confined to rotation, a pair of rotatable drive members, and clutch means for providing a rotation transmitting connection between the shaft and either selected one of said drive members while leaving the other drive member free for rotation relative to the shaft, said apparatus being characterized by:
    A. said clutch means comprising two pairs of clutch elements on said shaft, one pair for each of said drive members,
       (1) the clutch elements of each pair being axially spaced from one another and from the other pair of clutch elements and comprising
          (a) a proximal clutch element which is nearer to the other pair and
          (b) a distal clutch element which is farther from the other pair,
       (2) each said clutch element having a conical surface
          (a) which is concentric with the shaft and
          (b) which tapers in one axial direction,
          (c) said surfaces on the two clutch elements of each pair being tapered in opposite directions such that each faces obliquely toward the other;
    B. cooperating means on said clutch elements and the shaft
       (1) constraining every clutch element to rotate with the shaft,
       (2) confining each distal clutch element against axial shifting relative to the shaft, and
       (3) providing for limited shifting of each proximal clutch element towards and from its paired distal clutch element;
    C. each said drive member
       (1) being substantially annular,
       (2) having an inner periphery which is larger in diameter than the shaft, and
       (3) having a pair of concentric conical surfaces which face obliquely in axially opposite directions and each of which mates with the conical surface of one of the clutch elements of the pair for the drive member so that the clutch elements of that pair at all times support the drive member in radially spaced concentric relation to the shaft and confine the drive member against substantial axial shifting relative to the shaft;
    D. clutch disengaging means for each pair of clutch elements, reacting between them to urge the proximal clutch element away from the distal one and to a disengaged position in which the drive member for the pair can rotate relative to the clutch elements; and
    E. clutch engaging means on the shaft, between the proximal clutch elements, for alternately and selectably shifting each proximal clutch element toward its paired distal clutch element to an engaged position wherein the pair of clutch elements cooperate in rotatably connecting their drive member with the shaft, said clutch engaging means comprising
       (1) a concentric disc-like piston on the shaft, confined against axial shifting relative to the shaft,
       (2) a coaxial, axially shiftable cylinder on the shaft, surrounding and enclosing said piston in slidable sealed relation thereto, said cylinder having end walls at axially opposite sides of the piston that cooperate with it in defining a pair of pressure chambers, each of which
          (a) is expandable to shift the cylinder axially in one direction and
          (b) is communicated with a passage in the shaft through which pressure fluid can enter the chamber to expand it, and
       (3) abutment means on each said end wall, engageable against its adjacent proximal clutch element to translate shifting of the cylinder in each axial direction into shifting of a proximal clutch element to its engaged position.

2. The apparatus of claim 1, further characterized by:

(a) said concentric conical surfaces on one of said drive members being radially inner surfaces thereon which converge towards one another; and
(b) said conical surface on each clutch element of the pair of clutch elements for said one drive member
 (1) being a radially outer surface thereon and
 (2) tapering axially in the direction towards the other clutch element of that pair.

3. The apparatus of claim 1, further characterized by:
(a) one of said drive members having hub-like portions projecting axially to opposite sides thereof whereon that drive member has its conical surfaces, each of those conical surfaces being a radially outer surface that tapers axially outwardly; and (b) each clutch element of the pair of clutch elements for said one drive member having
 (1) an axially outer portion which is axially remote from that drive member and which engages the shaft, and
 (2) an axially inner portion which is adjacent to that drive member and whereon the clutch element has its conical surface, that conical surface being a radially inner surface which is radially spaced from the shaft and which diverges in the axial direction away from said outer portion.

4. The apparatus of claim 1 wherein said clutch disengaging means for each pair of clutch elements comprises resilient means at all times reacting between the clutch elements of the pair.

* * * * *